United States Patent
Neishi et al.

(10) Patent No.: US 10,669,604 B2
(45) Date of Patent: Jun. 2, 2020

(54) BOLT

(71) Applicants: NIPPON STEEL & SUMITOMO METAL CORPORATION, Tokyo (JP); AOYAMA SEISAKUSHO CO., LTD., Aichi (JP)

(72) Inventors: Yutaka Neishi, Muroran (JP); Makoto Kosaka, Kisarazu (JP); Naoki Matsui, Kisarazu (JP); Tetsushi Chida, Nishinomiya (JP); Keisuke Chiba, Toyota (JP); Hideo Kanisawa, Aichi (JP); Kazutaka Aoyama, Aichi (JP); Kazuoki Shibuya, Aichi (JP); Ryoko Inagaki, Aichi (JP)

(73) Assignees: NIPPON STEEL CORPORATION, Tokyo (JP); AOYAMA SEISAKUSHO CO., LTD., Aichi (JP)

( * ) Notice: Subject to any disclaimer, the term of this patent is extended or adjusted under 35 U.S.C. 154(b) by 183 days.

(21) Appl. No.: 15/737,799

(22) PCT Filed: Jun. 27, 2016

(86) PCT No.: PCT/JP2016/069050
§ 371 (c)(1),
(2) Date: Dec. 19, 2017

(87) PCT Pub. No.: WO2017/002770
PCT Pub. Date: Jan. 5, 2017

(65) Prior Publication Data
US 2019/0003000 A1 Jan. 3, 2019

(30) Foreign Application Priority Data
Jun. 29, 2015 (JP) .................................. 2015-129784

(51) Int. Cl.
*C21D 8/00* (2006.01)
*C21D 9/00* (2006.01)
(Continued)

(52) U.S. Cl.
CPC .............. *C21D 9/0093* (2013.01); *C21D 1/25* (2013.01); *C21D 6/004* (2013.01); *C21D 6/005* (2013.01);
(Continued)

(58) Field of Classification Search
None
See application file for complete search history.

(56) References Cited

U.S. PATENT DOCUMENTS

| | | | | |
|---|---|---|---|---|
| 2008/0240970 A1* | 10/2008 | Eto | ........................ | C21D 6/004 420/84 |
| 2017/0159693 A1* | 6/2017 | Matsumoto | .............. | C21D 8/06 |
| 2017/0175021 A1* | 6/2017 | Shiihashi | ................ | C23C 22/82 |

FOREIGN PATENT DOCUMENTS

| | | |
|---|---|---|
| JP | 10-053834 | 2/1998 |
| JP | 11-092868 | 4/1999 |

(Continued)

*Primary Examiner* — Melvin C. Mayes
*Assistant Examiner* — Christopher Douglas Moody
(74) *Attorney, Agent, or Firm* — Clark & Brody LLP (57) ABSTRACT

A bolt is provided that has high strength and excellent hydrogen embrittlement resistance characteristics. A bolt according to an embodiment of the present invention consists of, in mass %, C: 0.32 to 0.39%, Si: 0.15% or less, Mn: 0.40 to 0.65%, P: 0.020% or less, S: 0.020% or less, Cr: 0.85 to 1.25%, Al: 0.005 to 0.060%, Ti: 0.010 to 0.050%, B: 0.0010 to 0.0030%, N: 0.0015 to 0.0080%, O: 0.0015% or less, Mo: 0 to 0.05%, V: 0 to 0.05%, Cu: 0 to 0.50%, Ni: 0 to 0.30%, and Nb: 0 to 0.05%, with the balance being Fe and impurities. The bolt satisfies Formula (1) and Formula (2), and has a tensile strength of 1000 to 1300 MPa and satisfies Formula (3).

(Continued)

$$4.9 \leq 10C+Si+2Mn+Cr+4Mo+5V \leq 6.1 \quad (1)$$

$$Mn/Cr \leq 0.55 \quad (2)$$

$$[\text{dissolved Cr}]/Cr \geq 0.70 \quad (3)$$

8 Claims, 2 Drawing Sheets

(51) Int. Cl.
| | |
|---|---|
| C22C 38/54 | (2006.01) |
| F16B 35/00 | (2006.01) |
| C22C 38/02 | (2006.01) |
| C22C 38/04 | (2006.01) |
| C22C 38/06 | (2006.01) |
| C22C 38/42 | (2006.01) |
| C22C 38/44 | (2006.01) |
| C22C 38/46 | (2006.01) |
| C22C 38/48 | (2006.01) |
| C22C 38/50 | (2006.01) |
| C22C 38/00 | (2006.01) |
| C22C 38/26 | (2006.01) |
| C22C 38/20 | (2006.01) |
| C22C 38/22 | (2006.01) |
| C22C 38/28 | (2006.01) |
| C22C 38/32 | (2006.01) |
| C21D 1/25 | (2006.01) |
| C22C 38/24 | (2006.01) |
| C21D 6/00 | (2006.01) |

(52) U.S. Cl.
CPC ............ *C21D 6/008* (2013.01); *C21D 8/005* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *F16B 35/00* (2013.01); *C21D 9/00* (2013.01); *C21D 2211/008* (2013.01)

(56) References Cited

FOREIGN PATENT DOCUMENTS

| JP | 2008-156678 | 7/2008 | |
|---|---|---|---|
| JP | 2009-521600 | 6/2009 | |
| JP | 2012-162798 | 8/2012 | |
| WO | WO-2007074984 A1 * | 7/2007 | ............ C22C 38/02 |
| WO | 2015/083599 | 6/2015 | |

* cited by examiner

BOLT

TECHNICAL FIELD

The present invention relates to a bolt, and more particularly relates to a bolt with high strength.

BACKGROUND ART

In recent years, to address environmental problems and the like, weight reductions and enhanced strength are being sought with respect to members used in automobiles, industrial machinery, buildings and the like. In particular, tensile strength of 1000 MPa or more is being demanded with respect to bolts for automobiles such as engine cylinder head bolts and connecting rod bolts.

However, if a bolt has high tensile strength of 1000 MPa or more, the susceptibility to hydrogen embrittlement increases, and hydrogen embrittlement resistance (delayed fracture) characteristics are lowered. SCM steel (JIS Standard) that contains a large amount of an alloying element such as Mo, and alloy steel that contains an expensive alloying element such as V are used as the starting material for such high-strength bolts. These alloy steels are manufactured into wire rods, and are further subjected to wire drawing and cold forging to be manufactured into bolts.

In the case of using the aforementioned alloy steels as bolts, hydrogen embrittlement resistance characteristics are enhanced. However, because these alloy steels contain alloying elements in large amounts, the hardenability increases. Consequently, when these alloy steels are hot-rolled to produce wire rods, a hard microstructure such as bainite is formed. Because a wire rod that contains a hard microstructure is hard, it is difficult to perform wire drawing and cold forging thereon. Therefore, when forming bolts using wire rods of these alloy steels, it is a common practice to carry out a softening heat treatment multiple times prior to performing wire drawing and cold forging. The multiple softening heat treatments raise the production cost of the bolt. Accordingly, there is a need for a bolt for which enhanced strength and excellent hydrogen embrittlement resistance characteristics can be realized while keeping down the production cost.

To suppress the formation of bainite when producing a wire rod, it is sufficient to reduce the amount of alloying elements such as Mo and V contained in the steel. In this case, because formation of bainite is suppressed, a softening heat treatment can be omitted or simplified. However, it becomes difficult to provide the bolt with high strength, and the hydrogen embrittlement resistance characteristics also decrease.

Bolts that have high strength are proposed, for example, in the respective Patent Literatures described hereunder. The bolts proposed in these Patent Literatures contain boron to thereby increase hardenability, strengthen grain boundaries, and increase the strength.

Specifically, a bolt disclosed in Japanese Patent Application Publication No. 10-53834 (Patent Literature 1) contains, in mass %, B: 0.0008 to 0.004%, C: 0.4% or less, Ti: 0.025 to 0.06% and N: 0.006% or less. In this bolt, the relation between the ferrite grain size FGc and Ti compounds excluding TiN during hot rolling satisfies the expression: [amount of Ti compounds excluding TiN/FGc$^{1/2}$]×1000≥3. In addition, the austenite grain size number is 5 or more. It is described in Patent Literature 1 that, as a result, the tensile strength is more than 785N/mm$^2$.

However, in the bolt disclosed in Patent Literature 1, in a case where there is a high Mn content and a low Cr content, the hydrogen embrittlement resistance characteristics are low in some cases.

A bolt disclosed in National Publication of International Patent Application No. 2009-521600 (Patent Literature 2) has a composition containing, in weight %, 0.35 to 0.55% of carbon, 0.05 to 2.0% of silicon, 0.1 to 0.8% of manganese, 0.001 to 0.004% of boron, 0.3 to 1.5% of chromium, 0.005% or less of total oxygen (T.O.), 0.015% or less of phosphorus and 0.010% or less of sulfur, and also containing at least one type of element selected from the group consisting of 0.05 to 0.5% of vanadium, 0.05 to 0.5% of niobium, 0.1 to 0.5% of nickel, 0.1 to 1.5% of molybdenum and 0.01 to 0.1% of titanium, with the balance being Fe and impurities. This bolt has an internal micro-structure made of ferrite and tempered martensite, and the ferrite content in the internal microstructure is 3 to 10% by area fraction. It is described in Patent Literature 2 that this bolt is excellent in delayed fracture resistance characteristics and has enhanced strength.

However, the bolt proposed in Patent Literature 2 is made of dual phase steel having soft ferrite in an amount of 3 to 10% by area fraction and tempered martensite as the internal micro-structure of the bolt. Consequently, the bolt strength is apt to decrease in comparison to the case of steel having a tempered martensite single-phase structure. Therefore, in order to adjust the strength of the steel to a desired strength level, it is necessary to perform tempering at a lower temperature in comparison to steel that has a tempered martensite single-phase structure. Consequently, in some cases the hydrogen embrittlement resistance characteristics decrease at the desired strength. In addition, it is necessary to carry out treatment to adjust the ferritic microstructure, such as re-quenching and tempering during the production process. Consequently, the production cost increases.

A high-strength bolt disclosed in Japanese Patent Application Publication No. 2008-156678 (Patent Literature 3) is made from steel that contains, in mass %, C: more than 0.15% to 0.30% or less, Si: 1.0% or less, Mn: 1.5% or less, Ti: 0.1% or less, Mo: 0.3% or more to 0.5% or less and B: 0.0005% or more to 0.01% or less, with the balance being Fe and impurities. The steel is quenched, and thereafter subjected to tempering at 100 to 400° C. and the steel microstructure is made into a microstructure in which the average prior-austenite grain size after quenching is 10 μm or less. It is described in Patent Literature 3 that, by this means, a high-strength bolt that has the bolt strength range from approximately 1200 to 1800 MPa and has excellent delayed fracture resistance characteristics and corrosion resistance can be obtained.

However, because the bolt disclosed in Patent Literature 3 contains 0.3 to 0.5% of Mo, the hardenability is too high. Therefore, it is necessary to carry out a softening heat treatment for an extended period of time before performing wire drawing and cold forging. In such a case, the hydrogen embrittlement resistance characteristics may sometimes decrease.

Steel for a high-strength bolt that is disclosed in Japanese Patent Application Publication No. 2012-162798 (Patent Literature 4) contains, in mass %, C: 0.20 to less than 0.40%, Si: 0.20 to 1.50%, Mn: 0.30 to 2.0%, P: 0.03% or less (not including 0%), S: 0.03% or less (not including 0%), Ni: 0.05 to 1.0%, Cr: 0.01 to 1.50%, Cu: 1.0% or less (including 0%), Al: 0.01 to 0.10%, Ti: 0.01 to 0.1%, B: 0.0003 to 0.0050% and N: 0.002 to 0.010%, in which one or more types of element selected from the group consisting of Cu, Ni and Cr are contained in a total amount of 0.10 to 3.0%, with the balance being Fe and unavoidable impurities. In the steel, a ratio ([Si]/[C]) between the Si content [Si] and the C content [C] is 1.0 or more. It is described in Patent Literature 4 that by this means, without adding a large amount of an expensive alloying element such as Cr or Mo, a boron-added high-strength bolt that is excellent in delayed fracture resistance while also having high strength of 1100 MPa or more can be obtained.

However, in the steel disclosed in Patent Literature 4, the Ni content is high. Therefore, in some cases the hardenability is too high. Consequently, it is necessary to carry out a softening heat treatment for an extended period of time before performing wire drawing and cold forging. In such a case, the hydrogen embrittlement resistance characteristics sometimes decrease.

Steel for cold forging that is disclosed in Japanese Patent Application Publication No. 11-92868 (Patent Literature 5) contains, in mass %, C: 0.10 to 0.40%, Si: 0.15% or less, Mn: 0.30 to 1.00%, Cr: 0.50 to 1.20%, B: 0.0003 to 0.0050% and Ti: 0.020 to 0.100%, in which the content of P is limited to 0.015% or less (including 0%), the content of S is limited to 0.015% or less (including 0%), and the content of N is limited to 0.0100% or less (including 0%), with the balance being Fe and unavoidable impurities. In addition, the total quantity of particles of one or more types among TiC and Ti(CN) having a diameter of 0.2 µm or less in the matrix of the steel is 20 particles/100 µm$^2$ or more. It is described in Patent Literature 5 that, by this means, coarsening of the grains is prevented and delayed fracture resistance characteristics can be improved.

However, the bolt disclosed in Patent Literature 5 is not specialized technology, and in the case where bolts are produced, the hydrogen embrittlement resistance characteristics may be low in some cases.

CITATION LIST

Patent Literature

Patent Literature 1: Japanese Patent Application Publication No. 10-53834

Patent Literature 2: National Publication of International Patent Application No. 2009-521600

Patent Literature 3: Japanese Patent Application Publication No. 2008-156678

Patent Literature 4: Japanese Patent Application Publication No. 2012-162798

Patent Literature 5: Japanese Patent Application Publication No. 11-92868

SUMMARY OF INVENTION

An objective of the present invention is to provide a bolt that has high strength and also has excellent hydrogen embrittlement resistance characteristics.

A bolt according to an embodiment of the present invention has a chemical composition that consists of, in mass %, C: 0.32 to 0.39%, Si: 0.15% or less, Mn: 0.40 to 0.65%, P: 0.020% or less, S: 0.020% or less, Cr: 0.85 to 1.25%, Al: 0.005 to 0.060%, Ti: 0.010 to 0.050%, B: 0.0010 to 0.0030%, N: 0.0015 to 0.0080%, O: 0.0015% or less, Mo: 0 to 0.05%, V: 0 to 0.05%, Cu: 0 to 0.50%, Ni: 0 to 0.30% and Nb: 0 to 0.05%, with a balance being Fe and impurities, and that satisfies Formula (1) and Formula (2), wherein the bolt has tensile strength of 1000 to 1300 MPa, and satisfies Formula (3):

$$4.9 \leq 10C+Si+2Mn+Cr+4Mo+5V \leq 6.1 \quad (1)$$

$$Mn/Cr \leq 0.55 \quad (2)$$

$$[\text{dissolved Cr}]/Cr \geq 0.70 \quad (3)$$

where, a content (mass %) of a corresponding element is substituted for each symbol of an element in Formulae (1) to (3). If the corresponding element is at an impurity level, "0" is substituted for the symbol of the corresponding element in Formula (1) and Formula (2). A dissolved Cr amount (mass %) in the bolt is substituted for [dissolved Cr] in Formula (3).

Advantageous Effects Of Invention

A bolt according to an embodiment of the present invention has high strength and also has excellent hydrogen embrittlement resistance characteristics.

DESCRIPTION OF EMBODIMENTS

The present inventors conducted investigations and studies regarding the effects that the components and microstructure of steel had on the tensile strength and hydrogen embrittlement resistance characteristics of a bolt made using boron-containing steel containing C, Mn, Cr and B and the like and not containing an expensive alloying element such as Mo or V in a large amount. As a result, the present inventors obtained the following findings.

[Regarding Tensile Strength of Bolt]

Sufficient hardenability is required to provide the bolt with a high tensile strength of 1000 to 1300 MPa. However, if the hardenability is too high, before carrying out cold working such as wire drawing and cold forging with respect to a steel material such as a wire rod, a softening heat treatment must be performed for an extended time period multiple times for the purpose of softening the steel material. In this case, even if alloying elements such as Mo and V are not contained in a large amount, the production cost increases. Therefore, a steel material that enables cold working even without performing a softening heat treatment for an extended time period and that has hardenability with which the aforementioned tensile strength is obtained is desirable.

In a case where the chemical composition of a bolt satisfies Formula (1), excellent cold workability and hardenability are obtained:

$$4.9 \leq 10C+Si+2Mn+Cr+4Mo+5V \leq 6.1 \quad (1)$$

where, a content (mass %) of a corresponding element is substituted for each symbol of an element in Formula (1). With respect to Mo and V, if these elements are at an impurity level, "0" is substituted for the symbol of the corresponding element in Formula (1).

Herein, fn1 is defined as equal to 10C+Si+2Mn+Cr+4Mo+5V. C, Si, Mn, Cr, Mo and V are each elements that increase hardenability. Therefore, fn1 serves as an index of hardenability and cold workability.

If fn1 is too low, sufficient hardenability is not obtained. On the other hand, if fn1 is too high, the hardenability will be too high. In this case, when the steel for a bolt is rolled into a wire rod, bainite is formed and the strength and hardness increase. Therefore, cold workability is not obtained unless a softening heat treatment for an extended time period is carried out multiple times prior to a wire drawing process and a cold forging process that are subsequent processes. If fn1 satisfies Formula (1), while obtaining excellent hardenability, sufficient cold workability is obtained even if a softening heat treatment is omitted or a softening heat treatment is not performed for an extended time period.

[Regarding Hydrogen Embrittlement Resistance Characteristics]

[Regarding Relation between Mn/Cr and Hydrogen Embrittlement Resistance Characteristics]

Even if the bolt has a high tensile strength of 1000 to 1300 MPa, as long as Formula (2) is satisfied, excellent hydrogen embrittlement resistance characteristics are obtained:

$$Mn/Cr \leq 0.55 \qquad (2)$$

where, a content (mass %) of a corresponding element is substituted for each symbol of an element in Formula (2). In the following description, fn2 is defined as equal to Mn/Cr. fn2 corresponds to the left-hand side of Formula (2). Formula (2) is described hereunder.

Figure 1:
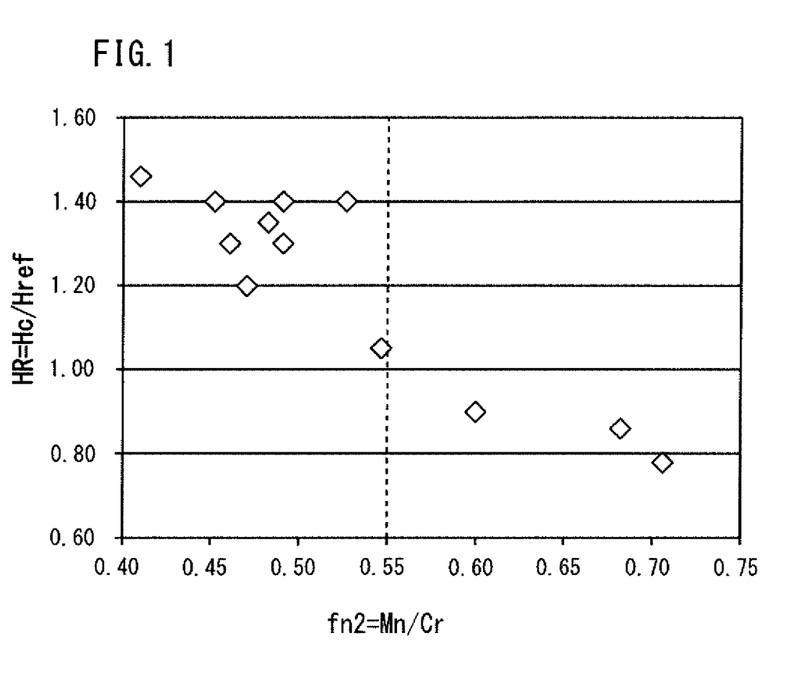
FIG. 1 is a view illustrating the relation between a critical diffusible hydrogen content and Mn/Cr contained in a bolt.

FIG. 1 is a view illustrating the relation between a critical diffusible hydrogen content and fn2. FIG. 1 was obtained by the following method.

Figure 2:
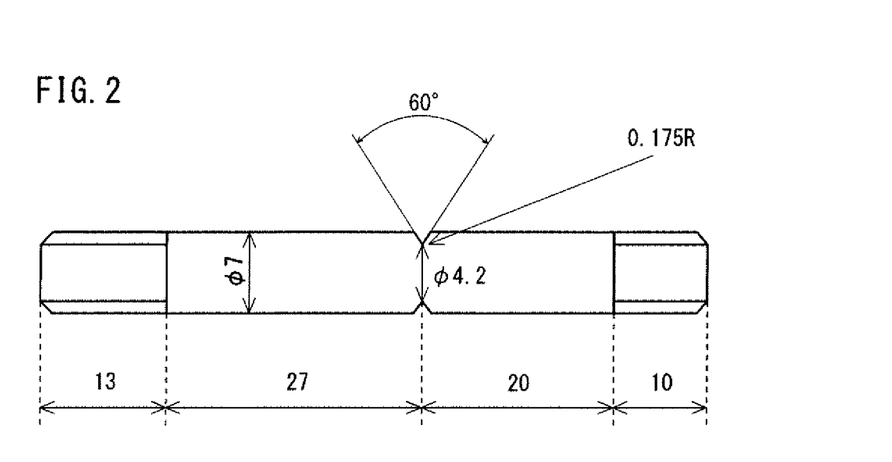
FIG. 2 is a side view of a test specimen with an annular V-notch.

Steels A to M having the chemical compositions shown in Table 1 were subjected to vacuum melting to produce ingots of 50 kg.

at the specified region. In FIG. 2, "60°" indicates that the V-notch angle is 60°. Further, "0.175R" indicates that radius of the bottom of the V-notch is 0.175 mm.

The electrolytic charging method was used to introduce hydrogen of various concentrations into the respective test specimens of the steels A to M. The electrolytic charging method was conducted in the following manner. Each test specimen was immersed in an ammonium thiocyanate aqueous solution. While the test specimen was in the immersed state, an anode potential was generated on the surface of the test specimen to introduce hydrogen into the test specimen. Thereafter, a galvanizing coating was formed on the surface of each test specimen to prevent the hydrogen in the test specimen from leaking to outside. Next, a constant load test that applied a constant load so that tensile stress of nominal stress of 1080 MPa was applied to a V-notch cross-section of the test specimen was performed. Programmed temperature gas chromatography was performed using a gas chromatography apparatus with respect to test specimens that ruptured during the test and test specimens that did not rupture to thereby measure the amount of hydrogen in each test specimen. After measurement, with respect to each of the steels, the maximum hydrogen amount at which a test specimen did not rupture was defined as the critical diffusible hydrogen content Hc (ppm).

In addition, taking a critical diffusible hydrogen content Href (ppm) of steel M having a chemical composition corresponding to SCM435 of JIS G4053 (2008) as a reference, a critical diffusible hydrogen content ratio HR (hereunder, referred to simply as "ratio HR") was defined by the following Formula (A).

$$HR = Hc/Href \qquad (A)$$

The ratio HR is an index of hydrogen embrittlement resistance characteristics. FIG. 1 was created based on the obtained ratio HR and fn2 of each steel.

TABLE 1

| | Chemical Composition (unit is mass percent; balance is Fe and impurities) | | | | | | | | | | | | | | | | | |
|---|---|---|---|---|---|---|---|---|---|---|---|---|---|---|---|---|---|---|
| Steel | C | Si | Mn | P | S | Cr | Al | Ti | B | N | O | Mo | V | Cu | Ni | Nb | fn1 | fn2 |
| A | 0.33 | 0.04 | 0.48 | 0.012 | 0.017 | 1.04 | 0.040 | 0.023 | 0.0025 | 0.0040 | 0.0007 | — | — | — | — | — | 5.34 | 0.46 |
| B | 0.37 | 0.09 | 0.59 | 0.010 | 0.015 | 1.12 | 0.038 | 0.020 | 0.0020 | 0.0035 | 0.0012 | — | — | — | — | — | 6.09 | 0.53 |
| C | 0.38 | 0.05 | 0.55 | 0.013 | 0.010 | 1.14 | 0.042 | 0.015 | 0.0018 | 0.0025 | 0.0011 | — | — | — | — | — | 6.09 | 0.48 |
| D | 0.32 | 0.10 | 0.47 | 0.009 | 0.009 | 0.86 | 0.028 | 0.025 | 0.0028 | 0.0038 | 0.0014 | — | — | — | — | — | 5.10 | 0.55 |
| E | 0.33 | 0.05 | 0.55 | 0.011 | 0.016 | 1.12 | 0.042 | 0.023 | 0.0027 | 0.0036 | 0.0012 | 0.03 | — | 0.03 | 0.06 | — | 5.69 | 0.49 |
| F | 0.32 | 0.07 | 0.52 | 0.014 | 0.015 | 1.15 | 0.039 | 0.021 | 0.0026 | 0.0041 | 0.0015 | — | 0.02 | 0.03 | 0.06 | — | 5.56 | 0.45 |
| G | 0.34 | 0.11 | 0.48 | 0.012 | 0.011 | 1.17 | 0.035 | 0.020 | 0.0019 | 0.0038 | 0.0014 | 0.048 | 0.024 | 0.03 | 0.06 | — | 5.95 | 0.41 |
| H | 0.33 | 0.05 | 0.55 | 0.011 | 0.016 | 1.12 | 0.042 | 0.023 | 0.0027 | 0.0036 | 0.0012 | — | — | — | — | 0.028 | 5.57 | 0.49 |
| I | 0.32 | 0.05 | 0.40 | 0.010 | 0.010 | 0.85 | 0.032 | 0.020 | 0.0020 | 0.0038 | 0.0012 | 0.01 | 0.005 | 0.02 | 0.02 | 0.02 | 4.97 | 0.47 |
| J | 0.37 | 0.08 | 0.58 | 0.005 | 0.014 | 0.85 | 0.045 | 0.014 | 0.0025 | 0.0034 | 0.0011 | — | — | — | — | — | 5.79 | 0.68 |
| K | 0.36 | 0.14 | 0.57 | 0.011 | 0.010 | 0.95 | 0.028 | 0.021 | 0.0020 | 0.0061 | 0.0015 | — | — | — | — | — | 5.83 | 0.60 |
| L | 0.33 | 0.08 | 0.60 | 0.010 | 0.003 | 0.85 | 0.032 | 0.021 | 0.0015 | 0.0040 | 0.0014 | 0.015 | — | — | — | — | 5.49 | 0.71 |
| M | 0.36 | 0.24 | 0.66 | 0.008 | 0.006 | 1.04 | 0.046 | 0.003 | — | 0.0060 | 0.0020 | 0.22 | — | 0.02 | 0.02 | — | 7.08 | 0.63 |

After each produced ingot was heated to 1200 to 1300° C., hot extend forging was carried out as a simulated hot rolling to produce a round bar with a diameter of 15 mm. After hot forging, the round bar was allowed to cool in atmosphere. Subsequently, the round bar was subjected to quenching and tempering as a simulated heat treatment after bolt forming, and the tensile strength of the round bar was adjusted to approximately 1200 MPa. After the tensile strength of the round bar was adjusted, the round bar was subjected to machining to manufacture a test specimen with an annular V-notch illustrated in FIG. 2. The numerical values for which a unit is not shown in FIG. 2 represent the dimensions (unit: mm) of a corresponding region of the test specimen. In FIG. 2, "φ numerical value" represents the diameter (mm)

Referring to FIG. 1, the ratio HR noticeably increases as fn2 decreases, that is, as the ratio of the Mn content to the Cr content decreases. Further, when fn2 becomes 0.55 or less, the ratio HR becomes higher than 1.00, and excellent hydrogen embrittlement resistance characteristics are obtained.

[Regarding Relation between Dissolved Cr and Hydrogen Embrittlement Resistance Characteristics]

The hydrogen embrittlement resistance characteristics are also influenced by the dissolved Cr amount in the bolt. If the bolt satisfies Formula (3), the hydrogen embrittlement resistance characteristics are enhanced:

$$[\text{dissolved Cr}]/\text{Cr} \geq 0.70 \qquad (3)$$

where, in Formula (3), a dissolved Cr amount (mass %) in the bolt is substituted for [dissolved Cr], and the Cr content in the chemical composition of the bolt (that is, the total Cr content; unit is percent by mass) is substituted for Cr.

The present inventors found for the first time that dissolved Cr enhances the strength with respect to hydrogen embrittlement of tempered martensite. The matrix microstructure of the bolt of the present embodiment is a tempered martensite single-phase structure. Therefore, if the dissolved Cr amount in the bolt is increased, the dissolved Cr amount in the tempered martensite single-phase structure increases, and hence the hydrogen embrittlement resistance characteristics of the bolt are enhanced. It is defined that fn3= [dissolved Cr]/Cr. If fn3 is 0.70 or more, because the dissolved Cr amount for increasing the strength of tempered martensite is sufficient, excellent hydrogen embrittlement resistance characteristics are obtained.

As conventionally practiced, if a softening heat treatment is performed for an extended time period multiple times after steel is made into a steel material (for example, a wire rod) by hot working, a large quantity of Cr carbo-nitrides are formed in the produced bolt. In this case, the dissolved Cr amount in the bolt decreases. Consequently, fn3 will no longer satisfy Formula (3).

Therefore, in the present embodiment, with respect to the steel material after hot working, a heat treatment for the purpose of softening is not performed before wire drawing and before cold forging, or even in a case where a beat treatment is performed, a retention time at 700° C. or more with respect to the steel material is made less than 40 minutes. In this case, even if a heat treatment is performed, the formation of carbides containing Cr is suppressed. Consequently, a dissolved Cr amount that is of a level sufficient for allowing fn3 to satisfy Formula (3) can be maintained.

The bolt according to the present embodiment that was completed based on the findings described above has a chemical composition that consists of, in mass %, C: 0.32 to 0.39%, Si: 0.15% or less, Mn: 0.40 to 0.65%, P: 0.020% or less, S: 0.020% or less, Cr: 0.85 to 1.25%, Al: 0.005 to 0.060%, Ti: 0.010 to 0.050%, B: 0.0010 to 0.0030%, N: 0.0015 to 0.0080%, O: 0.0015% or less, Mo: 0 to 0.05%, V: 0 to 0.05%, Cu: 0 to 0.50%, Ni: 0 to 0.30% and Nb: 0 to 0.05%, with a balance being Fe and impurities, and that satisfies Formula (1) and Formula (2), wherein the bolt has a tensile strength of 1000 to 1300 MPa, and satisfies Formula (3):

$$4.9 \leq 10C+Si+2Mn+Cr+4Mo+5V \leq 6.1 \quad (1)$$

$$Mn/Cr \leq 0.55 \quad (2)$$

$$[\text{dissolved Cr}]/Cr \geq 0.70 \quad (3)$$

where, a content (mass %) of a corresponding element is substituted for each symbol of an element in Formulae (1) to (3). If the corresponding element is at an impurity level, "0" is substituted for the symbol of the corresponding element in Formula (1) and Formula (2). A dissolved Cr amount (mass %) contained in the bolt is substituted for [dissolved Cr] in Formula (3).

The aforementioned chemical composition may contain one or more types of element selected from a group consisting of Mo: 0.01 to 0.05%, V: 0.005 to 0.05%, Cu: 0.03 to 0.50% and Ni: 0.03 to 0.30%.

The aforementioned chemical composition may contain Nb: 0.0015 to 0.05%.

Preferably, when a P content in an outer layer from the surface of the bolt to a depth of 50 µm is taken as Ps (mass %), and a P content at a central axis of the bolt is taken as Pc (mass %), the bolt satisfies Formula (4).

$$Ps/Pc \leq 1.2 \quad (4)$$

In this case, hydrogen embrittlement resistance characteristics are further enhanced.

Hereunder, the bolt according to the present embodiment will be described in further detail. The symbol "%" in relation to an element means "mass %" unless specifically stated otherwise.

[Chemical Composition]

The chemical composition of the bolt of the present embodiment contains the following elements.

C: 0.32 to 0.39%

Carbon (C) increases the hardenability of the bolt, and raises the tensile strength of the bolt after quenching and tempering to 1000 MPa or more. If the C content is less than 0.32%, the aforementioned effects are not obtained. On the other hand, if the C content is too high, the hardenability will be too high. In this case, the strength of the steel material for the bolt after hot working will be too high, and the cold workability will decrease. Consequently, for the purpose of softening the steel material, a softening heat treatment must be performed multiple times for an extended time period on the steel material prior to performing cold working such as wire drawing and cold forging, and hence the production cost rises. Furthermore, if the softening heat treatment is performed, the hydrogen embrittlement resistance characteristics decrease. Accordingly, the C content is from 0.32 to 0.39%. A preferable lower limit of the C content is 0.33%. A preferable upper limit of the C content is 0.38%.

Si: 0.15% or less

Silicon (Si) deoxidizes the steel. Si also increases the hardenability to enhance the strength of the bolt. However, if the Si content is more than 0.15%, the hardenability will be too high and the cold workability of the steel material will decrease. Accordingly, the Si content is 0.15% or less. A preferable lower limit of the Si content is 0.01%, and more preferably is 0.02%, and further preferably is 0.05%. A preferable upper limit of the Si content is 0.12%, and further preferably is 0.10%.

Mn: 0.40 to 0.65%

Manganese (Mn) increases the hardenability to make the tensile strength of the bolt 1000 MPa or more. If the Mn content is less than 0.40%, this effect is not obtained. On the other hand, if the Mn content is more than 0.65%, the hardenability will be too high, and the cold workability of the steel material for the bolt will decrease. Accordingly, the Mn content is from 0.40 to 0.65%. A preferable lower limit of the Mn content is 0.45%. A preferable upper limit of the Mn content is 0.60%, and more preferably is 0.55%.

P: 0.020% or less

Phosphorous (P) is an impurity. P segregates at the crystal grain boundary and decreases the cold workability and lowers the hydrogen embrittlement resistance characteristics of the bolt. Accordingly, the P content is 0.020% or less. A preferable upper limit of the P content is 0.015%. Preferably, the P content is as low as possible.

S: 0.020% or less

Sulfur (S) is an impurity. S forms sulfides and decreases the cold workability and lowers the hydrogen embrittlement resistance characteristics of the bolt. Accordingly, the S content is 0.020% or less. A preferable upper limit of the S content is 0.010%, and more preferably is 0.008%. Preferably, the S content is as low as possible.

Cr: 0.85 to 1.25%

Chromium (Cr) increases the hardenability to make the tensile strength of the bolt 1000 MPa or more. Cr also dissolves in tempered inartensite in the bolt, and thereby enhances the hydrogen embrittlement resistance characteristics of the bolt. If the Cr content is less than 0.85%, these effects are not obtained. On the other hand, if the Cr content is more than 1.25%, the hardenability will be too high, and the cold workability of the steel material for the bolt will decrease. Accordingly, the Cr content is from 0.85 to 1.25%. A preferable lower limit of the Cr content is 0.90%. An upper limit of the Cr content is 1.20%.

Al: 0.005 to 0.060%

Aluminum (Al) deoxidizes the steel. If the Al content is less than 0.005%, this effect is not obtained. On the other hand, if the Al content is more than 0.060%, coarse oxide-based inclusions will be generated and the cold workability will decrease. Accordingly, the Al content is from 0.005 to 0.060%. A preferable lower limit of the Al content is 0.010%. A preferable upper limit of the Al content is 0.055%. In the chemical composition of the bolt according to the present invention, the term "Al content" means the total amount of Al contained in the steel material.

Ti: 0.010 to 0.050%

Titanium (Ti) bonds with N in the steel to form nitrides (TiN). As a result of the formation of TiN, the formation of BN is suppressed and the amount of dissolved B increases. Consequently, the hardenability of the steel material is enhanced. Ti also bonds with C to form carbides (TiC) and refine the grains. By this means, the hydrogen embrittlement resistance characteristics of the bolt are enhanced. If the Ti content is less than 0.010%, these effects are not obtained. On the other hand, if the Ti content is more than 0.050%, coarse TiN is formed in a large amount. In this case, the cold workability and hydrogen embrittlement resistance characteristics will decrease. Accordingly, the Ti content is from 0.010 to 0.050%. A preferable lower limit of the Ti content is 0.015%. A preferable upper limit of the Ti content is 0.045%.

B: 0.0010 to 0.0030%

Boron (B) increases the hardenability of the steel. B also suppresses grain boundary segregation of P to enhance the hydrogen embrittlement resistance characteristics of the bolt. If the B content is less than 0.0010%, these effects are not obtained. On the other hand, if the B content is more than 0.0030%, the effect of increasing the hardenability is saturated. In addition, coarse BN is formed and the cold workability decreases. Accordingly, the B content is from 0.0010 to 0.0030%. A preferable lower limit of the B content is 0.0015%. A preferable upper limit of the B content is 0.0025%.

N: 0.0015 to 0.0080%

Nitrogen (N) bonds with Ti in the steel to form nitrides and refines the grains. If the N content is less than 0.0015%, this effect is not obtained. On the other hand, if the N content is more than 0.0080%, the effect is saturated. In addition, N bonds with B to form nitrides, and thereby reduces the amount of dissolved B. In this case, the hardenability of the steel decreases. Accordingly, the N content is from 0.0015 to 0.0080%. A preferable lower limit of the N content is 0.0020%. A preferable upper limit of the N content is 0.0070%.

O: 0.0015% or less

Oxygen (O) is an impurity. O forms oxides and decreases the cold workability. If the O content is more than 0.0015%, oxides are formed in a large amount and MnS coarsens and the cold workability noticeably decreases. Accordingly, the O content is 0.0015% or less. A preferable upper limit of the O content is 0.0013%. Preferably, the O content is as low as possible.

The balance of the chemical composition of the bolt according to the present embodiment is Fe and impurities. Here, the term "impurities" refers to elements which, during industrial production of the bolt, are mixed in from ore or scrap that is used as a raw material, or from the production environment or the like, and which are allowed within a range that does not adversely affect the present invention.

[Optional Elements]

The aforementioned bolt may further contain one or more types of element selected from the group consisting of Mo, V, Cu and Ni as a substitute for a part of Fe. Each of these elements is an optional element, and each of these elements increases the hardenability of the steel.

Mo: 0 to 0.05%

Molybdenum (Mo) is an optional element, and need not be contained in the steel. In a case where Mo is contained, the Mo increases the hardenability of the steel. However, if the Mo content is more than 0.05%, the hardenability will be too high and the cold workability of the steel material for the bolt will decrease. Accordingly, the Mo content is from 0 to 0.05%. A preferable lower limit of the Mo content for more effectively obtaining the aforementioned effect is 0.01%, and further preferably is 0.015%. A preferable upper limit of the Mo content is 0.03%, and further preferably is 0.025%.

V: 0 to 0.05%

Vanadium (V) is an optional element, and need not be contained in the steel. In a case where V is contained, the V increases the hardenability of the steel. V also forms carbides, nitrides or carbo-nitrides and refines the grains. However, if the V content is more than 0.05%, the carbides or the like will coarsen and the cold workability will decrease. Accordingly, the V content is from 0 to 0.05%. A preferable lower limit of the V content for more effectively obtaining the aforementioned effects is 0.005%. A preferable upper limit of the V content is 0.03%, and more preferably is 0.02%.

Cu: 0 to 0.50%

Copper (Cu) is an optional element, and need not be contained in the steel. In a case where Cu is contained, the Cu increases the hardenability of the steel. However, if the Cu content is more than 0.50%, the hardenability will be too high and the cold workability will decrease. Accordingly, the Cu content is from 0 to 0.50%. A preferable lower limit of the Cu content for more effectively obtaining the aforementioned effect is 0.03%, and further preferably is 0.05%. A preferable upper limit of the Cu content is 0.30%, and further preferably is 0.20%.

Ni: 0 to 0.30%

Nickel (Ni) is an optional element, and need not be contained in the steel. In a case where Ni is contained, the Ni increases the hardenability of the steel. Ni also increases the toughness of the steel material after quenching. However, if the Ni content is more than 0.30%, the hardenability will be too high and the cold workability will decrease. Accordingly, the Ni content is from 0 to 0.30%. A preferable lower limit of the Ni content for more effectively obtaining the aforementioned effects is 0.03%, and further preferably is 0.05%. A preferable upper limit of the Ni content is 0.20%, and further preferably is 0.10%.

The chemical composition of the bolt according to the present embodiment may also contain Nb as a substitute for a part of Fe.

Nb: 0 to 0.05%

Niobium (Nb) is an optional element, and need not be contained in the steel. In a case where Nb is contained, the Nb bonds with C and N to form carbides, nitrides or carbo-nitrides and refines the grains. Nb also enhances the hydrogen embrittlement resistance characteristics of the bolt. However, if the Nb content is more than 0.05%, coarse carbides or the like are formed and the cold workability of the steel material decreases. Accordingly, the Nb content is from 0 to 0.05%. A preferable lower limit of the Nb content for more effectively obtaining the aforementioned effects is 0.0015%. A preferable upper limit of the Nb content is 0.04%, and more preferably is 0.03%.

[Regarding Formula (1)]

The chemical composition of the bolt according to the present invention also satisfies Formula (1).

$$4.9 \leq 10C+Si+2Mn+Cr+4Mo+5V \leq 6.1 \tag{1}$$

The content (mass %) of a corresponding element is substituted for each symbol of an element in Formula (1). If the corresponding element is at an impurity level, "0" is substituted for the symbol of the corresponding element in Formula (1).

$fn1=10C+Si+2Mn+Cr+4Mo+5V$ is an index of hardenability. If fn1 is too low, sufficient hardenability is not obtained. On the other hand, if fn1 is too high, the hardenability will be too high. In this case, when the steel for a bolt is rolled into a wire rod, bainite is formed and the strength and hardness of the steel material increase. Consequently, cold workability is not obtained unless a softening heat treatment for an extended time period is carried out multiple times prior to a wire drawing process and a cold forging process that are subsequent processes. If fn1 is from 4.9 to 6.1, excellent hardenability can be obtained. In addition, even if a softening heat treatment is omitted or a softening heat treatment for an extended time period is not performed, sufficient cold workability is obtained. A preferable lower limit of fn1 is 4.95. A preferable upper limit of fn1 is 6.0.

[Regarding Formula (2)]

The chemical composition of the bolt according to the present invention further satisfies Formula (2):

$$Mn/Cr \leq 0.55 \tag{2}$$

where, the content (mass %) of a corresponding element is substituted for each symbol of an element in Formula (2).

It is defined that $fn2=Mn/Cr$. Referring to FIG. 1, the lower that fn2 is, the more noticeable an increase in the ratio HR is. Further, when fn2 becomes 0.55 or less, the ratio HR becomes higher than 1.00, and excellent hydrogen embrittlement resistance characteristics are obtained. A preferable upper limit of fn2 is 0.50.

[Regarding Formula (3)]

The bolt according to the present embodiment further satisfies Formula (3).

$$[\text{dissolved Cr}]/Cr \, 0.70 \tag{3}$$

In Formula (3), a dissolved Cr amount (mass %) in the bolt is substituted for [dissolved Cr], and the Cr content (mass %) in the chemical composition of the bolt is substituted for Cr.

The expression $fn3=[\text{dissolved Cr}]/Cr$ shows the ratio of the dissolved Cr amount in the bolt to the Cr content in the chemical composition. In a case where fn3 is high, a larger amount of Cr is dissolved. Therefore, the strength with respect to hydrogen embrittlement of the tempered martensite increases, and the hydrogen embrittlement resistance characteristics are enhanced. In a case where the chemical composition of the bolt according to the present invention satisfies Formula (2) and also satisfies Formula (3), the ratio HR of the bolt becomes higher than 1.00 and excellent hydrogen embrittlement resistance characteristics are obtained. A preferable lower limit of fn3 is 0.75.

The dissolved Cr amount is measured by the following method. A test specimen is extracted that includes the central axis of the bolt. The test specimen is electrolyzed in a 10% AA-based electrolytic solution. The term "10% AA-based electrolyte" refers to a 10% acetylacetone-1% tetramethylammonium chloride-methanol solution. After electrolysis, the electrolyte solution is filtered using a filter with a pore size of 0.1 μm to recover the residue. The Cr amount (mass %) in the residue that is recovered is analyzed using an inductively coupled plasma (ICP) mass spectrometer. The term "Cr amount in the residue" refers to the amount of Cr other than the amount of dissolved Cr in the residue (that is, the Cr amount contained in Cr precipitates such as Cr carbo-nitrides). Therefore, the dissolved Cr amount (mass %) is determined by the following Formula B using the Cr amount in the residue.

Dissolved Cr amount=Cr content of entire bolt-Cr amount in the residue (B)

The dissolved Cr amount that is obtained is used to determine fn3.

[Regarding Formula (4)]

Preferably, when the P content in an outer layer from the surface of the bolt to a depth of 50 μm (in a case where a coating such as a plating layer is formed on the surface of the bolt, a depth of 50 μm from the surface of the starting material (base metal) of the bolt itself from which the coating was removed) is taken as Ps (mass %), and the P content at the central axis of the bolt is taken as Pc (mass %), the bolt satisfies Formula (4).

$$Ps/Pc \leq 1.2 \tag{4}$$

In this case, the P content of the bolt outer layer does not become excessively higher than the internal P content of the bolt. Therefore, the occurrence of a situation in which excess P in the outer layer segregates at the grain boundary can be suppressed, and the hydrogen embrittlement resistance characteristics are further enhanced.

The P content Ps in the outer layer is determined by the following method. At one arbitrary location on the bolt, the P content (mass %) in a range (outer layer) from the surface to a depth of 50 μm is determined. Specifically, the P content is measured at a pitch of 1 μm from the surface of the bolt to a depth of 50 μm using an electron probe microanalyzer (EPMA). The average of the measured P concentrations is defined as the P concentration Ps of the outer layer. The obtained P content Ps is used to determine $fn4=Ps/Pc$. In this case, the P content (mass %) in the chemical composition of the bolt is taken as Pc.

To produce a bolt that satisfies Formula (4), it is sufficient to apply a lubricant coating (lubricant) that does not contain P when performing wire drawing. Alternatively, after performing cold working using a lubricant coating containing P, the lubricant coating can be removed from the bolt surface prior to quenching that is described later.

[Micro-Structure of Bolt]

The matrix micro-structure of the bolt of the present embodiment is a tempered martensite single-phase structure. That is, the area fraction of the tempered martensite in the matrix micro-structure is 100%.

[Production Method]

An example of a method for producing the bolt according to the present invention will now be described. First, steel material for the bolt is produced by a well-known production method (starting material production process). Thereafter, the bolt is produced using the steel material for the bolt (bolt production process). Hereunder, the respective processes are described.

[Starting Material Production Process]

Molten steel having the aforementioned chemical compositions is produced. A cast piece is produced by a continuous casting process using the molten steel. Alternatively, an ingot is produced by an ingot-making process using the molten steel. The produced cast piece or ingot is subjected to billeting to form a billet. The billet is subjected to hot working to form steel material (wire rod) for the bolt. The hot working is, for example, hot rolling.

[Bolt Production Process]

In the bolt production process, the bolt is produced using the steel material for the bolt. The bolt production process includes a wire drawing process, a cold forging process and a quenching and tempering process. Each of these processes is described hereunder.

[Wire Drawing Process]

First, the wire rod is subjected to wire-drawing to produce steel wire. The wire-drawing may be only primary wire drawing, or may be wire-drawing that is carried out multiple times such as a primary wire drawing, a secondary wire drawing and the like. When performing the wire drawing, a lubricant coating is to be formed on the surface of the wire rod. The lubricant coating is, for example, a phosphate coating or a non-phosphorus-based lubricant coating.

Preferably a lubricant coating that does not contain P is used. Alternatively, in the case of using a phosphate coating, the surface of the steel material (steel wire) is cleaned or pickled to remove the phosphate coating from the surface before performing a quenching process that is described later. The cleaning is, for example, a well-known alkaline cleaning. In this case, the produced bolt satisfies Formula (4).

[Cold Forging Process]

The steel material that underwent wire drawing is cut to a predetermined length, and the steel material that was cut is subjected to cold forging to produce a bolt.

[Regarding Softening Heat Treatment]

In the conventional method for producing a high-strength bolt, to soften steel material (wire rod) for a bolt in which the strength is too high, a softening heat treatment is performed multiple times before wire drawing and before cold forging. However, with the bolt according to the present invention, because Formula (1) is satisfied, such a softening heat treatment can be omitted or simplified. By this means, an increase in the production cost that is caused by carrying out the softening heat treatment can be suppressed, and the hydrogen embrittlement resistance characteristics of the bolt can also be enhanced.

In the case of performing a simplified softening heat treatment, the steel material is subjected to heat treatment at 700° C. or more for a retention time of less than 40 minutes. In this case, excessive formation of carbides containing Cr can be suppressed and a dissolved Cr amount can be adequately ensured in the bolt to satisfy Formula (3). Consequently, the produced bolt has excellent hydrogen embrittlement resistance characteristics.

[Quenching and Tempering Process]

The bolt produced by the cold forging is subjected to quenching and tempering under well-known conditions to adjust the tensile strength of the bolt to 1000 to 1300 MPa. In a case where a lubricant coating containing P such as a phosphate coating is utilized when performing the wire drawing process, as described above, preferably the surface of the steel material (steel wire) is subjected to alkaline cleaning before performing quenching. By this means, P is removed from the surface, and the bolt that underwent tempering satisfies Formula (4).

The bolt of the present invention is produced by the foregoing production process.

EXAMPLES

Molten steel having the chemical compositions in Table 2 were produced.

TABLE 2

| | Chemical Composition (unit is mass percent; balance is Fe and impurities) | | | | | | | | | | | | | | | | | |
|---|---|---|---|---|---|---|---|---|---|---|---|---|---|---|---|---|---|---|
| Steel | C | Si | Mn | P | S | Cr | Al | Ti | B | N | O | Mo | V | Cu | Ni | Nb | fn1 | fn2 |
| A | 0.33 | 0.04 | 0.48 | 0.012 | 0.017 | 1.04 | 0.040 | 0.023 | 0.0025 | 0.0040 | 0.0007 | — | — | — | — | — | 5.34 | 0.46 |
| C | 0.38 | 0.05 | 0.55 | 0.013 | 0.010 | 1.14 | 0.042 | 0.015 | 0.0018 | 0.0025 | 0.0011 | — | — | — | — | — | 6.09 | 0.48 |
| D | 0.32 | 0.10 | 0.47 | 0.009 | 0.009 | 0.86 | 0.028 | 0.025 | 0.0028 | 0.0038 | 0.0014 | — | — | — | — | — | 5.10 | 0.55 |
| E | 0.33 | 0.05 | 0.55 | 0.011 | 0.016 | 1.12 | 0.042 | 0.023 | 0.0027 | 0.0036 | 0.0012 | 0.03 | — | 0.03 | 0.06 | — | 5.69 | 0.49 |
| G | 0.34 | 0.11 | 0.48 | 0.012 | 0.011 | 1.17 | 0.035 | 0.020 | 0.0019 | 0.0038 | 0.0014 | 0.048 | 0.024 | 0.03 | 0.06 | — | 5.95 | 0.41 |
| I | 0.32 | 0.05 | 0.40 | 0.010 | 0.010 | 0.85 | 0.032 | 0.020 | 0.0020 | 0.0038 | 0.0012 | 0.01 | 0.005 | 0.02 | 0.02 | 0.02 | 4.97 | 0.47 |
| O | 0.33 | 0.12 | 0.41 | 0.008 | 0.009 | <u>0.75</u> | 0.031 | 0.024 | 0.0029 | 0.0040 | 0.0015 | — | — | — | — | — | 4.99 | 0.55 |
| P | 0.34 | 0.07 | <u>0.67</u> | 0.011 | 0.018 | 1.24 | 0.031 | 0.025 | 0.0023 | 0.0040 | 0.0012 | — | — | — | — | — | 6.05 | 0.54 |
| Q | 0.32 | 0.02 | 0.40 | 0.010 | 0.005 | 0.85 | 0.032 | 0.021 | 0.0015 | 0.0040 | 0.0012 | — | — | — | — | — | <u>4.87</u> | 0.47 |
| R | 0.37 | 0.10 | 0.59 | 0.008 | 0.004 | 1.18 | 0.028 | 0.018 | 0.0021 | 0.0038 | 0.0014 | 0.03 | — | 0.03 | 0.05 | — | <u>6.28</u> | 0.50 |
| L | 0.33 | 0.08 | 0.60 | 0.010 | 0.003 | 0.85 | 0.032 | 0.021 | 0.0015 | 0.0040 | 0.0014 | 0.015 | — | — | — | — | 5.49 | <u>0.71</u> |
| M | 0.36 | <u>0.24</u> | <u>0.66</u> | 0.008 | 0.006 | 1.04 | 0.046 | <u>0.003</u> | — | 0.0060 | <u>0.0020</u> | 0.22 | — | 0.02 | 0.02 | — | <u>7.08</u> | <u>0.63</u> |
| N | 0.33 | 0.10 | 0.61 | 0.008 | 0.009 | 0.91 | 0.028 | 0.024 | 0.0028 | 0.0041 | 0.0016 | — | — | — | — | — | 5.53 | <u>0.67</u> |

Referring now to Table 2, as described above, steel M had a chemical composition corresponding to the chemical composition of SCM435 of JIS G4053 (2008).

Billets having a transverse cross-section of 162 mm×162 mm were produced by a continuous casting process using the molten steel. Each billet was subjected to hot working (hot rolling) to produce a wire rod with a diameter of 11.5 mm.

The wire rods of the respective test numbers shown in Table 3 were subjected to wire-drawing to produce steel wire. At such time, Test Numbers 2, 5, 14 and 15 were subjected to a heat treatment for the purpose of softening the steel material. The heat treatment conditions (heat treatment temperature, heat treatment time period, and cooling method after the heat treatment) were as shown in Table 3. Further, the respective time periods (minutes) for which the wire rods were held at 700° C. or more during the heat treatment were as shown in Table 3. Note that, prior to wire-drawing, the wire rods of the respective test numbers were subjected to a phosphate treatment to form a phosphate coating on the wire rod surface.

TABLE 3

| Test Number | Steel | fn1 | fn2 | Heat Treatment Temperature (° C.) | Heat Treatment Time Period (min) | Cooling Method | Retention Time at 700° C. or more (min) | Bolt Forming Possible/Not Possible | Lubricant Removal |
|---|---|---|---|---|---|---|---|---|---|
| 1 | A | 5.34 | 0.46 | — | — | — | — | Possible | Yes |
| 2 | C | 6.09 | 0.48 | 690 | 30 | Air Cooling | 0 | Possible | Yes |
| 3 | D | 5.10 | 0.55 | None | — | — | — | Possible | Yes |
| 4 | E | 5.69 | 0.49 | None | — | — | — | Possible | Yes |
| 5 | G | 5.95 | 0.41 | 700 | 30 | Air Cooling | 30 | Possible | Yes |
| 6 | I | 4.97 | 0.47 | None | — | — | — | Possible | Yes |
| 7 | E | 5.69 | 0.49 | None | — | — | — | Possible | No |
| 8 | O | 4.99 | 0.55 | None | — | — | — | Possible | Yes |
| 9 | P | 6.05 | 0.54 | None | — | — | — | NotPossible | Yes |
| 10 | Q | 4.87 | 0.47 | None | — | — | — | Possible | Yes |
| 11 | R | 6.28 | 0.50 | None | — | — | — | NotPossible | Yes |
| 12 | L | 5.49 | 0.71 | None | — | — | — | Possible | Yes |
| 13 | N | 5.53 | 0.67 | None | — | — | — | Possible | Yes |
| 14 | M | 7.08 | 0.63 | 750 | 60 | Slow Cooling | 180 | Possible | Yes |
| 15 | G | 5.95 | 0.41 | 720 | 30 | Slow Cooling | 60 | Possible | Yes |

| Test Number | Quenching Temperature (° C.) | Tempering Temperature (° C.) | fn3 | Tensile Strength (MPa) | fn4 | HR = Hc/Href | Evaluation | Remarks |
|---|---|---|---|---|---|---|---|---|
| 1 | 880 | 480 | 0.95 | 1200 | 1.00 | 1.30 | ○ | Example Embodiment of Present Invention |
| 2 | 880 | 500 | 0.85 | 1280 | 1.10 | 1.25 | ○ | Example Embodiment of Present Invention |
| 3 | 900 | 470 | 0.90 | 1200 | 1.00 | 1.10 | ○ | Example Embodiment of Present Invention |
| 4 | 890 | 510 | 1.00 | 1100 | 1.00 | 1.35 | ○ | Example Embodiment of Present Invention |
| 5 | 880 | 490 | 0.80 | 1200 | 1.15 | 1.40 | ○ | Example Embodiment of Present Invention |
| 6 | 900 | 465 | 0.95 | 1300 | 1.05 | 1.25 | ○ | Example Embodiment of Present Invention |
| 7 | 900 | 490 | 1.00 | 1150 | ≥1.2 | 1.05 | ○ | Example Embodiment of Present Invention |
| 8 | 880 | 480 | 0.95 | 1200 | 1.05 | 0.90 | X | Comparative Example |
| 9 | — | — | — | — | — | — | X | Comparative Example |
| 10 | 900 | 435 | 0.90 | 910 | 1.00 | — | X | Comparative Example |
| 11 | — | — | — | — | — | — | X | Comparative Example |
| 12 | 880 | 440 | 0.95 | 1200 | 1.05 | 0.85 | X | Comparative Example |
| 13 | 880 | 440 | 0.95 | 1200 | 1.10 | 0.80 | X | Comparative Example |
| 14 | 900 | 450 | 0.65 | 1200 | 1.05 | 1.00 | X | Comparative Example |
| 15 | 890 | 460 | 0.60 | 1200 | 1.15 | 0.75 | X | Comparative Example |

Figure 3:
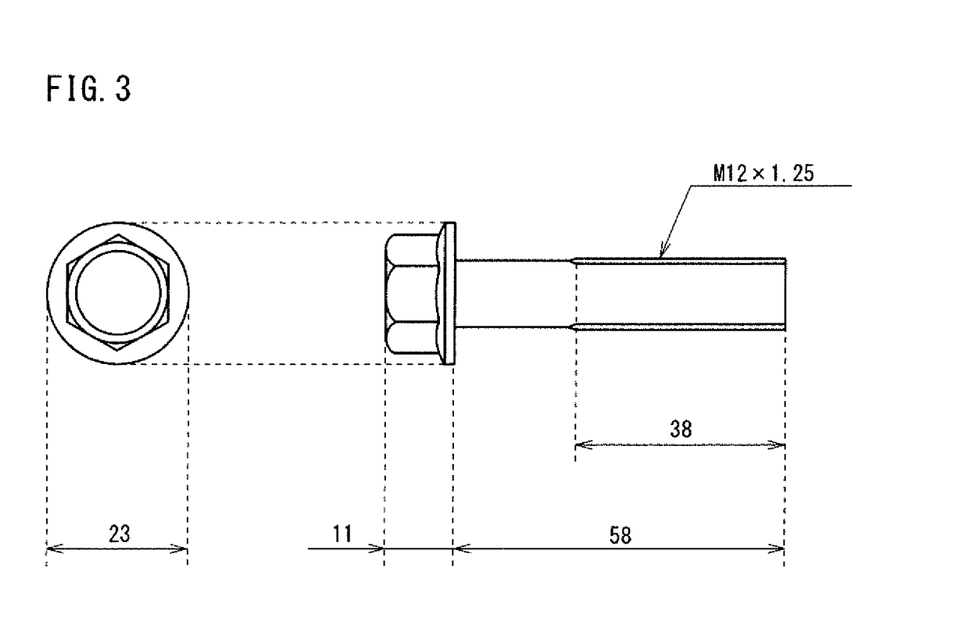
FIG. 3 illustrates a side view and a front view of a thread that was produced in the Examples.

The steel wire of each test number was subjected to cold forging to produce the bolt illustrated in FIG. 3. Referring to FIG. 3, the bolt contour was defined by a metric thread in accordance with JIS B0205, which was, more specifically, of a fine pitch thread (pitch: 1.25 mm) with a nominal diameter (M) of 12 mm. The respective numerical values in FIG. 3 represent the dimensions (mm) of a corresponding region.

After forming the bolt, the bolt was visually observed to check for the occurrence of cracking.

The bolts of test numbers in which cracking was not observed were subjected to quenching and tempering, and the tensile strength was adjusted to be between 1000 and 1300 MPa. Prior to performing quenching, the respective surfaces of the bolts of Test Numbers 1 to 6 and 8 to 15 were subjected to alkaline cleaning to remove the phosphate coating. In contrast, the bolt of Test Number 7 was not subjected to alkaline cleaning. Consequently, the bolt of Test Number 7 underwent quenching in a state in which a phosphate coating was adhered thereto.

In the quenching, the bolt was held for 40 minutes at the quenching temperature (° C.) shown in Table 3, and was thereafter subjected to oil quenching. In the tempering, the bolt was held for 70 minutes at the tempering temperature shown in Table 3. The respective bolts were produced by the foregoing processes.

Note that, with respect to a case where the tempering temperature for obtaining the desired tensile strength (1000 MPa to 1300 MPa) of the bolt was less than 435° C., it was determined that the bolt strength was insufficient, and the relevant case was excluded from the objects of the present invention

[Tension Test]

The tensile strength (MPa) of the respective bolts of each test number were measured at room temperature (25° C.) in atmosphere in accordance with JIS B1051 (2000). The measurement results are shown in Table 3.

[Hydrogen Embrittlement Resistance Characteristics Evaluation Test]

The electrolytic charging method was used to introduce hydrogen of various concentrations into the respective bolts of each test number. The electrolytic charging method was performed in the following manner. The relevant bolt was immersed in an ammonium thiocyanate aqueous solution. In a state in which the bolt was immersed in the solution, an anode potential was generated on the surface of the bolt to thereby introduce hydrogen into the bolt.

After hydrogen was introduced inside the bolt, a galvanizing coating was formed on the bolt surface to prevent the hydrogen contained in the bolt from leaking to outside of the bolt. Next, a constant load test that applied a tensile strength equivalent to 95% of the tensile strength of the bolt was performed. Programmed temperature gas chromatography was performed using a gas chromatography apparatus with respect to bolts that ruptured during the test and bolts that did not rupture to thereby measure the amount of hydrogen in each bolt. After measurement, with respect to each test number, the maximum hydrogen amount at which a test specimen did not rupture was defined as the critical diffusible hydrogen content Hc.

In addition, the critical diffusible hydrogen content ratio HR was determined using Formula (A) by taking the critical diffusible hydrogen content Href of steel M that had a chemical composition corresponding to the chemical composition of SCM435 as a reference.

[Dissolved Cr Amount Measurement Test]

For each test number, a test specimen was extracted that included the central axis of the corresponding bolt, and the dissolved Cr amount (mass %) was determined by the method described above. The dissolved Cr amount that was determined was used to determine fn3.

[Test to Measure P Concentration in Outer Layer]

In the thread part of the bolt of each test number, one arbitrary location at the root of the thread was selected, and the P content Ps (mass %) of the outer layer was determined by the method described above. The determined P content Ps was used to determine fn4=Ps/Pc. In this case, Pc was taken as the P content (P content in Table 2) in the chemical composition of the bolt.

[Test Results]

The test results are shown in Table 3.

The respective chemical compositions of the bolts of Test Numbers 1 to 7 were appropriate. In addition, fn1 satisfied Formula (1), fn2 satisfied Formula (2), and fn3 satisfied Formula (3). As a result, while the bolts of these test numbers has a high tensile strength of 1000 to 1300 MPa, the critical diffusible hydrogen content ratio HR of the bolts was higher than 1.00 and the bolts were excellent in hydrogen embrittlement resistance characteristics.

In addition, with respect to the bolts of Test Numbers 1 to 6, because the phosphate coating was removed by alkaline cleaning, fn4 (=Ps/Pc) satisfied Formula (4). Therefore, the ratio HR was high in comparison to Test Number 7 for which fn4 did not satisfy Formula (4).

On the other hand, the Cr content of Test Number 8 was too low. Therefore, the ratio HR was a low ratio that was not more than 1.00, and the hydrogen embrittlement resistance characteristics were low.

The Mn content of Test Number 9 was too high. Therefore, the cold workability of the steel material (wire rod) for the bolt was low, and cracking was observed in the bolt after cold forging.

In the bolt of Test Number 10, fn1 was less than the lower limit of Formula (1). Therefore, even when the tempering temperature was lowered to 435° C., the tensile strength was less than 1000 MPa.

In the bolt of Test Number 11, fn1 was more than the upper limit of Formula (1). Therefore, the cold workability of the steel material for the bolt (wire rod) was low, and cracking was observed in the bolt after cold forging.

In Test Numbers 12 and 13, fn2 (=Mn/Cr) did not satisfy Formula (2). Consequently, the ratio HR was less than 1.00 and the hydrogen embrittlement resistance characteristics were low.

The bolt of Test Number 14 had a chemical composition corresponding to the chemical composition of SCM435 of the JIS Standard that is used for the conventional bolts, and the critical diffusible hydrogen content thereof was adopted as the reference (Href) for the critical diffusible hydrogen content ratio HR.

In Test Number 15, the retention time at 700° C. or more during softening heat treatment was more than 40 minutes. Consequently, fn3 (=[dissolved Cr]/Cr) did not satisfy Formula (3). Therefore, the ratio HR was less than 1.00, and the hydrogen embrittlement resistance characteristics were low. It is considered that Cr carbo-nitrides were formed by the softening heat treatment and the dissolved Cr decreased, and as a result the hydrogen embrittlement resistance characteristics were low.

An embodiment of the present invention has been described above. However, the foregoing embodiment is merely an example for implementing the present invention. Accordingly, the present invention is not limited to the above embodiment, and the above embodiment can be appropriately modified within a range that does not deviate from the gist of the present invention.

The invention claimed is:

1. A bolt having a chemical composition consisting of, in mass %:
C: 0.32 to 0.39%,
Si: 0.15% or less,
Mn: 0.40 to 0.65%,
P: 0.020% or less,
S: 0.020% or less,
Cr: 0.85 to 1.25%,
Al: 0.005 to 0.060%,
Ti: 0.010 to 0.050%,
B: 0.0010 to 0.0030%,
N: 0.0015 to 0.0080%,
O: 0.0015% or less,
Mo: 0 to 0.05%,
V: 0 to 0.05%,
Cu: 0 to 0.50%,
Ni: 0 to 0.30%, and
Nb: 0 to 0.05%,
with a balance being Fe and impurities, and satisfying Formula (1) and Formula (2),
wherein the bolt:
has a tensile strength of 1000 to 1300 MPa, and satisfies Formula (3);

$$4.9 \leq 10C+Si+2Mn+Cr+4Mo+5V \leq 6.1 \quad (1)$$

$$Mn/Cr \leq 0.55 \quad (2)$$

$$[\text{dissolved Cr}]/Cr \geq 0.70 \quad (3),$$

where, a content (mass %) of a corresponding element is substituted for each symbol of an element in Formulae (1) to (3); in a case where a corresponding element is at an impurity level, "0" is substituted for the symbol of the corresponding element in Formula (1); and a dissolved Cr amount (mass %) in the bolt is substituted for [dissolved Cr] in Formula (3).

2. The bolt according to claim 1, containing one or more types of element selected from a group consisting of:
Mo: 0.01 to 0.05%,
V: 0.005 to 0.05%,
Cu: 0.03 to 0.50%, and
Ni: 0.03 to 0.30%.

3. The bolt according to claim 1, containing:
Nb: 0.0015 to 0.05%.

4. The bolt according to claim 2, containing:
Nb: 0.0015 to 0.05%.

5. The bolt according to claim 1, wherein:
when a P content in an outer layer from a surface of the bolt to a depth of 50 μm is taken as Ps (mass %), and a P content at a central axis of the bolt is taken as Pc (mass %), the bolt satisfies Formula (4):

$$Ps/Pc \leq 1.2 \quad (4).$$

6. The bolt according to claim 2, wherein:
when a P content in an outer layer from a surface of the bolt to a depth of 50 μm is taken as Ps (mass %), and a P content at a central axis of the bolt is taken as Pc (mass %), the bolt satisfies Formula (4):

$$Ps/Pc \leq 1.2 \quad (4).$$

7. The bolt according to claim 3, wherein:
when a P content in an outer layer from a surface of the bolt to a depth of 50 μm is taken as Ps (mass %), and a P content at a central axis of the bolt is taken as Pc (mass %), the bolt satisfies Formula (4):

$$Ps/Pc \leq 1.2 \quad (4).$$

8. The bolt according to claim 4, wherein:
when a P content in an outer layer from a surface of the bolt to a depth of 50 μm is taken as Ps (mass %), and a P content at a central axis of the bolt is taken as Pc (mass %), the bolt satisfies Formula (4):

$$Ps/Pc \leq 1.2 \quad (4).$$

* * * * *